3,154,559
DIAZIDOCARBAZOLEDISULFONIC ACIDS AND METHOD FOR MAKING SAME
Henry M. Grotta, Delaware, Ohio, Myron N. Lugasch, deceased, late of Columbus, Ohio, by Phyllis T. Lugasch, heir, Scranton, Pa., assignors, by mesne assignments, to Martin-Marietta Corporation, New York, N.Y., a corporation of Maryland
No Drawing. Filed Sept. 11, 1963, Ser. No. 308,306
6 Claims. (Cl. 260—315)

The present invention relates to diazidocarbazoledisulfonic acids and to the method for making same.

The products of the present invention are useful as components in making a light sensitive coating for making deep-etch photolithographic plates. For example, a coating composition comprising an aqueous dispersion of 1,6-diazidocarbazoledisulfonic acid, 3,6-diazidocarboledisulfonic acid, hydroxyethylcellulose, and ammonium hydroxide may be used to coat photolithographic plates in the conventional manner.

One product of the present invention comprises an isomeric mixture of 1,6-diazidocarbazoledisulfonic acid and 3,6-diazidocarbazoledisulfonic acid. Generally speaking, this isomeric mixture may be prepared by nitration of carbazole to form 1,6- and 3,6-dinitrocarbazole, sulfonation of the dinitrocarbazoles to form 1,6- and 3,6-dinitrocarbazoledisulfonic acid, reducing the dinitrocarbazoledisulfonic acid to form 1,6- and 3,6-diaminocarbazoledisulfonic acid, tetrazotizing the diaminocarbazoledisulfonic acids to form carbazoledisulfonic acid 1,6- and 3,6-tetrazonium dichloride, and reacting the tetrazonium salts with sodium azide to form 1,6- and 3,6-diazidocarbazoledisulfonic acid.

Another product of the present invention is 1,6-diazidocarbazoledisulfonic acid. It may be prepared by sulfonating 1,6-dinitrocarbazole to form 1,6-dinitrocarbazoledisulfonic acid, reducing the 1,6-dinitrocarbazoledisulfonic to form 1,6-diaminocarbazoledisulfonic acid, tetrazotizing the 1,6-diaminocarbazoledisulfonic acid to form carbazoledisulfonic acid 1,6-tetrazonium dichloride, and reacting the tetrazonium salt with sodium azide to form 1,6-diazidocarbazoledisulfonic acid.

Another product of the present invention is 3,6-diazidocarbazoledisulfonic acid. It may be prepared by sulfonating 3,6-dinitrocarbazole to form 3,6-dinitrocarbazoledisulfonic acid, reducing the 3,6-dinitrocarbazoledisulfonic acid to form 3,6-diaminocarbazoledisulfonic acid, tetrazotizing the 3,6-diaminocarbazoledisulfonic acid to form carbazoledisulfonic acid 3,6-tetrazonium dichloride, and reacting the tetrazonium salt with sodium azide to form 3,6-diazidocarbazoledisulfonic acid.

The following are illustrative examples of the methods of the present invention.

*Example 1*

The nitration of carbazole to form 1,6- and 3,6-dinitrocarbazole is conducted as follows. Charge 100 lbs. glacial acetic acid into a reactor, add 5.1 lbs. 100% carbazole, cool to 30° C., and 2.3 lbs. sodium nitrite, add at 30°–34° C. over one hour a mixture consisting of 4.75 lbs. 95% nitric acid and 10 lbs. glacial acetic acid, heat to 50° C. over 10 minutes, stir at 50° C. for 2 hours, heat to 80° C. over 45 minutes, add 12 lbs. glacial acetic acid, heat at 90°–100° C. for 2 hours, cool to 50° C., let stand at 50° C. for 12 hours, and recover the solids by filtration. Wash the solids with 10 lbs. glacial acetic acid, slurry the solids in 100 lbs. glacial acetic acid at 50° C. for 4 hours, recover the solids by filtration at 50° C., wash the solids with 10 lbs. glacial acetic acid, wash the solids with water at room temperature until acid free, and dry the resulting mixture of 1,6- and 3,6-dinitrocarbazole.

The sulfonation of the mixture of 1,6- and 3,6-dinitrocarbazole to produce a mixture of 1,6- and 3,6-dinitrocarbazoledisulfonic acid isomers is conducted as follows. Charge 1,000 gms. sulfuric acid into a reactor, add 290 gms. of the above mixture of 1,6- and 3,6-dinitrocarbazole, stir at 50° C. for 1 hour, heat to 80° C. and stir for 1 hour while permitting the temperature to rise to 110° C. from the heat of reaction, cool to 30° C., add q.s. ice and water to bring the volume to 6 liters, neutralize with 50% sodium hydroxide, and recover the solids by filtration.

The mixture of 1,6- 3,6-dinitrocarbazoledisulfonic acid is reduced to a mixture of 1,6- 3,6-diaminocarbazoledisulfonic acid as follows. The above resulting solids are added to 3 liters of water, 320 gms. ground iron are added, and 60 gms. of 30% hydrochloric acid are added. Boil for 12 hours, cool to 90° C., add 25 gms. sodium carbonate, add 20 gms. activated boneblack, stir 30 minutes, filter and recover the filtrate, evaporate the filtrate to 2 liters, allow the filtrate to stand for 12 hours while the solids precipitate, recover the solids by filtration, and dry the resulting mixture of 1,6- and 3,6-diaminocarbazoledisulfonic acid isomers at 80° C.

The remainder of the synthesis may be conducted in subdued light.

26.9 gms. of the mixture of 1,6- and 3,6-diaminocarbazoledisulfonic acid slurried with 200 ml. hydrochloric acid and 1 liter of water, is tetrazotized at less than 10° C. by adding, during 20 minutes, 20.7 gms. sodium nitrite in 100 ml. water. After an additional 25 minutes of agitation, the tetrazonium salt solution (carbazoledisulfonic acid 1,6- and 3,6-tetrazonium dichloride) is recovered by filtration, 600 additional ml. of water having been added thereto in washing the reaction vessel and filtering.

30 gms. of sodium azide in 200 ml. water is added, with stirring, to the tetrazonium salt solution, causing foaming and precipitation. Following two hours of stirring, the solid (mixture of 1,6- and 3,6-diazidocarbazoledisulfonic acid) is recovered by filtration and dried over calcium chloride at 60° C. under vacuum. The resulting isomeric mixture of isomers may be used in a light sensitive coating for making photolithographic plates.

*Example 2*

The following is an illustrative example of the method of making 1,6-diazidocarbazoledisulfonic acid.

1,6-dinitrocarbazole is prepared as follows. A slurry is prepared by addnig 44.7 gms. of carbazole to 350 gms. of glacial acetic acid. The slurry is stirred and maintained at 30°–40° C. for 1.5 hours, during which time 19.2 gms. of sodium nitrite is added. The slurry is heated and stirred for 30 additional minutes, following which an additional 2.7 gms. of sodium nitrite is added, resulting in 9-nitrosocarbazole, mostly in solution. A solution containing 40.5 gms. of 90% nitric acid and 40.5 gms. of glacial acetic acid is added thereto, during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for two hours, cooled to 65° C., filtered, the filtrate discarded; and the resulting solid washed with 191.5 ml. of cold glacial acetic acid, washed with water, and dried. 47 gms. of a crude mixture of 1,6-dinitrocarbazole and 3,6-dinitrocarbazole results. To 45.8 gms. of the crude dinitrocarbazoles is added, with stirring, 3.02 liters of a 60 gm. per liter solution of potassium hydroxide in absolute alcohol. A solution of the potassium salt of 3,6-dinitrocarbazole and an insoluble residue of the potassium salt of 1,6-dinitrocarbazole results. These potassium salts are separated by filtration. The insoluble residue (potassium salt of 1,6-dinitrocarbazole) is digested on a steam bath with 201 ml. of a 5% aqueous solution of HCl to form 1,6-dinitrocarbazole and KCl, which is filtered to recover the solids. The solids are washed thoroughly with warm water to remove the KCl and dried to recover 1,6-dinitrocarbazole. The 1,6-dinitrocarbazole is dissolved in hot nitrobenzene, filtered while hot, and the resulting filtrate cooled to recrystallize the 1,6-dinitrocarbazole, which is recovered by filtration and warmed under vacuum to dry the product.

The 1,6-dinitrocarbazole is sulfonated and reduced to 1,6-diaminocarbazole disulfonic acid as follows. 14.5 gms. of 1,6-dinitrocarbazole and 57 gms. 98% $H_2SO_4$ are stirred at 50° C. for one hour, gradually heated to 90° C. over two hours, held at 90° C. for two additional hours, cooled to 30° C., added to 250 ml. water, neutralized with NaOH, cooled to 25° C., filtered, and the precipitate collected. The precipitate is added to a beaker containing 150 ml. water, 16 gms. powdered iron, and 3 ml. 30% HCl, followed by stirring and boiling for 12 hours. The composition in the beaker is neutralized with $Na_2CO_3$, filtered to remove the iron sludge, and the resulting filtrate boiled with carbon and filtered while hot to remove the carbon. The filtrate is evaporated to 100 ml. or less, cooled to 15° C., and the 1,6-diaminocarbazoledisulfonic acid recovered by filtration and dried at 60° C.

The remainder of the synthesis may be conducted in subdued light.

The 1,6-diaminocarbazoledisulfonic acid is tetrazotized as follows. The each gram thereof, add 4.4 ml. concentrated HCl in 11.2 ml. water; cool to 5° C.; add 0.4 gm. sodium nitrite in saturated aqueous solution per gm. of 1,6-diaminocarbazoledisulfonic acid, while maintaining the temperature at 5°–10° C.; and filter. A solution of carbazoledisulfonic acid 1,6-tetrazonium dichloride results.

The carbazoledisulfonic acid 1,6-tetrazonium dichloride is reacted with sodium azide to form 1,6-diazidocarbazoledisulfonic acid as follows. A saturated aqueous solution of sodium azide, containing 1.1 gms. of sodium azide per gram of 1,6-diaminocarbazolesdisulfonic acid that was used above, is added to the carbazoledisulfonic 1,6-tetrazonium dichloride solution. Nitrogen gas is evolved, and the composition is agitated for one hour. The resulting 1,6-diazidocarbazoledisulfonic acid solids are collected by filtration, washed with water, and dried at 30° C. over calcium chloride in vacuo.

*Example 3*

The following is an illustrative example of the method of making 3,6-diazidocarbazoledisulfonic acid.

3,6-dinitrocarbazole is prepared as follows. A slurry is prepared by adding 44.7 gms. of carbazole to 350 gms. of glacial acetic acid. The slurry is stirred and maintained at 30°–40° C. for 1.5 hours, during which time 19.2 gms. of sodium nitrite is added. The slurry is heated and stirred for 30 additional minutes, following which an additional 2.7 gms. of sodium nitrite is added, resulting in 9-nitrosocarbazole, mostly in solution. A solution containing 40.5 gms. of 90% nitric acid and 40.5 gms. of glacial acetic acid is added thereto, during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for two hours, cooled to 65° C., filtered, the filtrate discarded; and the resulting solid washed with 191.5 ml. of said glacial acetic acid, washed with water, and dried. 47 gms. of a crude mixture of 1,6-dinitrocarbazole and 3,6-dinitrocarbazole results. To 45.8 gms. of the crude dinitrocarbazoles is added, with stirring, 3.02 liters of a 60 gms. per liter solution of potassium hydroxide in absolute ethyl alcohol. A solution of the potassium salt of 3,6-dinitrocarbazole and an insoluble residue of the potassium salt of 1,6-dinitrocarbazole results. These potassium salts are separated by filtration, and to the filtrate is added 302 ml. of concentrated HCl; and yellow precipitates, comprising 3,6-dinitrocarbazole and potassium chloride are formed. The yellow precipitates are washed thoroughly with warm water to remove the KCl, collected by filtration and dried. The resulting 3,6-dinitrocarbazole is dissolved in hot nitrobenzene, filtered while hot and in solution, the filtrate cooled to recrystallize the 3,6-dinitrocarbazole, and the crystals are collected by filtration and warmed under vacuum to dry the 3,6-dinitrocarbazole.

The 3,6-dinitrocarbazole is sulfonated and reduced to 3,6 - diaminocarbazoledisulfonic acid as follows. 14.5 gms. of 3,6-dinitrocarbazole and 57 gms. 98% $H_2SO_4$ are stirred at 50° C. for one hour, gradually heated to 90° C. over two hours, held at 90° C. for two additional hours, cooled to 30° C., added to 250 ml. water, neutralized with NaOH, cooled to 25° C., filtered and the precipitate collected. The precipitate is added to a beaker containing 150 ml. water, 16 gms. powdered iron, and 3 ml. 30% HCl, followed by stirring and boiling for 12 hours. The composition in the beaker is neutralized with $Na_2CO_3$, filtered to remove the iron sludge, and the resulting filtrate boiled with carbon and filtered while hot to remove the carbon. The filtrate is evaporated to 100 ml. or less, cooled to 15° C., and the 3,6-diaminocarbazoledisulfonic acid solids recovered by filtration and dried at 60° C.

The remainder of the synthesis may be conducted in subdued light.

The 3,6 - diaminocarbazoledisulfonic acid is tetrazotized as follows. The each gram thereof, add 4.4 ml. concentrated HCl in 11.2 ml. water; cool to 5° C.; add 0.4 gm. sodium nitrite in saturated aqueous solution per gram of 3,6-diaminocarbazoledisulfonic acid, while maintaining the temperature at 5°–10° C.; and filter. A solution of carbazoledisulfonic acid 3,6-tetrazonium dichloride results.

The carbazoledisulfonic acid 3,6-tetrazonium dichloride is reacted with sodium azide to form 3,6-diazidocarbazoledisulfonic acid as follows. A saturated aqueous solution of sodium azide, containing 1.1 gms. of sodium azide per gram of 3,6-diaminocarbazoledisulfonic acid that was used above, is added to the carbazoledisulfonic 3,6 - tetrazonium dichloride solution. Nitrogen gas is evolved, and the composition is agitated for one hour. The resulting 3,6-diazidocarbazoledisulfonic acid solids are collected by filtration, washed with water, and dried at 30° C. over calcium chloride in vacuo.

What is claimed is:

1. A mixture of 1,6-diazidocarbazoledisulfonic acid and 3,6-diazidocarbazoledisulfonic acid isomers.
2. 1,6-diazidocarbazoledisulfonic acid.
3. 3,6-diazidocarbazoledisulfonic acid.
4. A method for producing a mixture of 1,6-diazidocarbazoledisulfonic acid and 3,6-diazidocarbazoledisulfonic acid isomers comprising the steps of nitration of carbazole to give a mixture of 1,6- and 3,6-dinitrocarbazole isomers, sulfonation of the dinitrocarbazole isomers to form a mixture of 1,6- and 3,6-dinitrocarbazoledisulfonic acid isomers to form a mixture of 1,6- and 3,6 dinitrocarbazoledisulfonic acid isomers, reducing the dinitrocarbazoledisulfonic acid isomers to form a mixture of 1,6- and 3,6-diaminocarbazoledisulfonic acid isomers, tetrazotizing the diaminocarbazoledisulfonic acid isomers to form a mixture of carbazoledisulfonic acid 1,6- and 3,6-tetrazonium dichloride isomers, and reacting the tetrazonium dichloride isomers with sodium azide to form a mixture of 1,6- and 3,6 - diazidocarbazoledisulfonic acid isomers.
5. A method for producing 1,6 - diazidocarbazoledisulfonic acid comprising the steps of sulfonating 1,6- dinitrocarbazole to form 1,6-dinitrocarbazoledisulfonic acid, reducing the 1,6-dinitrocarbazoledisulfonic acid to form 1,6-diamniocarbazoledisulfonic acid, tetrazotizing the 1,6 - diaminocarbazoledisulfonic acid to form carbazoledisulfonic acid 1,6-tetrazonium dichloride, and reacting said tetrazonium salt with sodium azide to form 1,6-diazidocarbazoledisulfonic acid.

6. A method for producing 3,6-diazidocarbazoledisulfonic acid comprising the steps of sulfonating 3,6-dinitrocarbazole to form 3,6 - dinitrocarbazoledisulfonic acid, reducing the 3,6-dinitrocarbazoledisulfonic acid to form 3,6-diaminocarbazoledisulfonic acid, tetrazotizing the 3,6 - diaminocarbazoledisulfonic acid to form carbazoledisulfonic acid 3,6-tetrazonium dichloride, and reacting said tetrazonium salt with sodium azide to form 3,6-diazidocarbazoledisulfonic acid.

No references cited.

UNITED STATES PATENT OFFICE
CERTIFICATE OF CORRECTION

Patent No. 3,154,559                 October 27, 1964

Henry M. Grotta et al.

It is hereby certified that error appears in the above numbered patent requiring correction and that the said Letters Patent should read as corrected below.

Column 2, lines 12 and 13, after "1,6-", each occurrence, insert -- and --; column 3, line 70, for "said" read -- cold --.

Signed and sealed this 9th day of March 1965.

(SEAL)
Attest:

ERNEST W. SWIDER
Attesting Officer

EDWARD J. BRENNER
Commissioner of Patents